Feb. 17, 1931.  W. V. LOZIER  1,792,994
METHOD OF MAKING TRIMMING DIES
Filed March 20, 1928
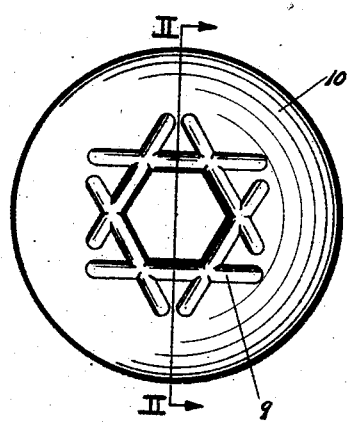
Fig. I.
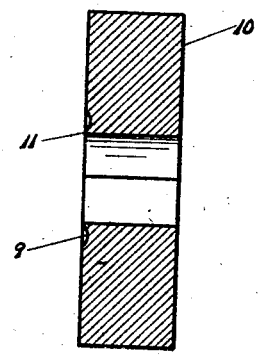
Fig. II.
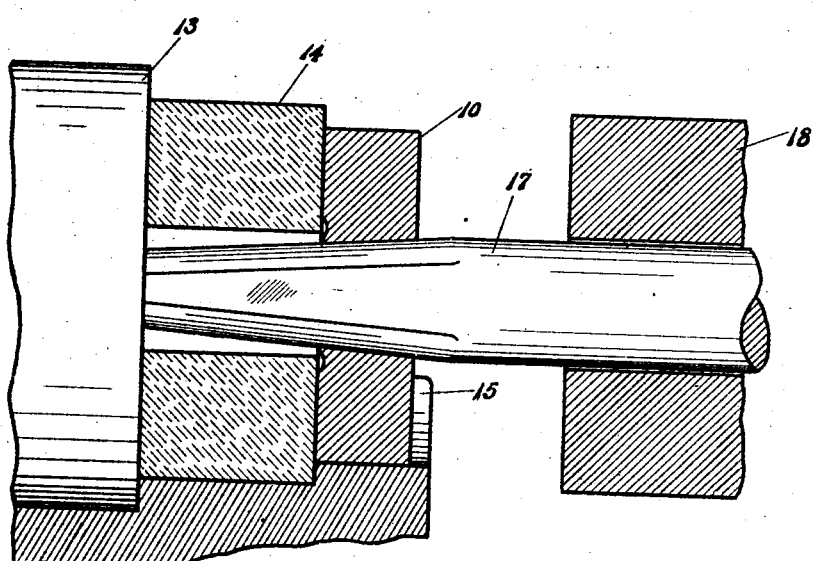
Fig. III.
INVENTOR.
WILLIAM V. LOZIER
BY Warren T. Hunt
ATTORNEY.

Patented Feb. 17, 1931

1,792,994

UNITED STATES PATENT OFFICE

WILLIAM V. LOZIER, OF ELMIRA, NEW YORK, ASSIGNOR TO THE WILLYS-MORROW COMPANY, OF ELMIRA, NEW YORK, A CORPORATION OF OHIO

METHOD OF MAKING TRIMMING DIES

Application filed March 20, 1928. Serial No. 263,139.

My invention relates to the art of machine tool manufacture and it is particularly related to a method of manufacturing dies having a tapered aperture therein.

In manufacturing trimming dies such for example as are utilized in bolt head trimming machines, it is customary to drill and broach a blank to approximately the minimum dimension. Subsequently the discharge side of the aperture is tapered outwardly slightly in order to facilitate the passage of the bolt therethrough. This operation is performed by filing, and consequently is time consuming as well as costly.

It is the ultimate and principal object of the present invention to reduce the cost of manufacturing these dies.

As a more immediate object the invention contemplates a method of manipulating the die blanks while in a hot semi-plastic condition whereby the required taper may be imparted to the aperture by means of a swaging operation.

It is a further object of the invention to obviate the necessity of skilled hand labor and to reduce the time which has heretofore been normally required for the tapering operation.

These together with other objects, will become more apparent from the drawings and detailed description hereinafter set forth.

According to the present invention, the broached die blank is heated to an elevated temperature and swaged while hot.

The die is then quickly removed from the swaging tool and is thereafter heat treated and is thereby completed without additional machining.

In the drawing:

Figure I is a plan view of a die blank after the drilling and broaching operation.

Fig. II is a sectional view of the structure illustrated in Fig. I taken along the line II—II.

Fig. III is an elevational view partly in section of a die in operative relation with respect to the swaging tool.

According to the present invention a die blank 10 is formed by finishing and turning the same over its entire surface after which a hole is drilled through the blank which is subsequently broached. The resulting article appears as in Figs. I and II. The cutting edge of the die indicated by numeral 11 functions to trim the head of the bolt as it is forced therethrough. A groove 9 circumscribes the cutting edge and functions to aid the cutting action of the die. In order to facilitate the movement of the trimmed bolt head through the die, the discharge end is tapered slightly whereby the trimming edge alone is of the minimum diameter.

For this purpose there is provided a stationary abutment member 13 against which is reposed a hollow block 14 preferably one having refractory properties. A supporting plate 15 is secured in a suitable manner to the stationary elements and is adapted to maintain the die blank 10 in alignment with respect to the aperture in the hollow block. A swage 17 likewise aligned with respect to the aperture passes through a guide block 18 and is adapted to reciprocate axially, its limit of travel being accurately defined. The taper which is imparted to the die may be varied by changing the width of the supporting block 14 or the length of the stroke of the swage 17.

In practising the invention the broached blanks are heated in an electric furnace for example, to a critical temperature at which they may readily be manipulated; 1250° F. has been found to give satisfactory results for many steels. When the blank has attained this temperature it is placed in position as illustrated in Fig. III after which the swage is forced through the aperture until it abuts the plate. To prevent freezing the die is removed quickly and is then in readiness for the final hardening or heat treatment. It should be noted that the cutting edge of the die is not destroyed by the swaging operation nor is any subsequent machining necessary; also that any manner of preparing the die for the swaging may be employed other than that suggested, namely, to drill a hole in the block and thereafter broach the same. In all, the operation requires but a few minutes of time, the method is therefore particularly adaptable to volume production since a large number of dies may be heated at one time, and the actual swaging operation may be performed in a very few moments.

Although there is described but a single embodiment of my invention, it will be apparent that the principles underlying the same are not so limited but may be extended to include other dies which include tapered portions and I desire, therefore, that it be restricted only as indicated in the appended claim.

I claim:

The method of making dies for trimming polygonal headed bolts which comprises forming in a die a hole having a polygonal cutting edge, thereafter forcing through said die a tapered swage of similar polygonal cross section, and arresting the movement of said swage when the cross section of the swage having dimensions equal to the hole enclosed by polygonal cutting edges is aligned with the plane of the edges.

In testimony whereof, I affix my signature.

WILLIAM V. LOZIER.